United States Patent [19]

Fishman

[11] Patent Number: 5,655,017
[45] Date of Patent: Aug. 5, 1997

[54] PORTABLE TELEPHONE WITH SPEAKERPHONE

[75] Inventor: David A. Fishman, Lakewood, N.J.

[73] Assignee: Lucent Technologies Inc., Murray Hill, N.J.

[21] Appl. No.: 401,389

[22] Filed: Mar. 9, 1995

[51] Int. Cl.[6] .................................................. H04M 1/00
[52] U.S. Cl. ........................ 379/420; 379/446; 379/454; 379/455
[58] Field of Search ...................... 379/446, 426, 379/420, 455, 454, 433, 428, 429, 434, 447, 58; 455/89, 90, 78, 79, 115, 116

[56] References Cited

U.S. PATENT DOCUMENTS 5,367,556  11/1994  Marui et al. .............................. 379/446
5,369,701  11/1994  McAteer et al. ......................... 379/420

FOREIGN PATENT DOCUMENTS 4311135  11/1992  Japan ..................................... 379/433

Primary Examiner—Jack K. Chiang

[57] ABSTRACT

A portable telephone includes a telephone body; a circuit mounted in the telephone body for receiving a signal and for supplying a signal for transmission; and a bass reflex speaker connected with the telephone body and the circuit for radiating an audio signal therefrom in response to the transmitted signal, the bass reflex speaker including a housing connected to the telephone body, an opening in the housing, a speaker mounted in the opening of the housing and connected to the circuit for radiating an audio signal outwardly of the housing in response to the received signal, a tuned port in the housing for radiating a back wave audio signal of the speaker therethrough, a tube in the housing and connected with the tuned port for enhancing tuning of the tuned port, a pressure switch for activating the bass reflex speaker to radiate the audio signal when the telephone body is positioned on a surface in an upright position, and a volume control connected to the circuit and which controls a volume of the audio signal radiated from the bass reflex speaker.

15 Claims, 1 Drawing Sheet

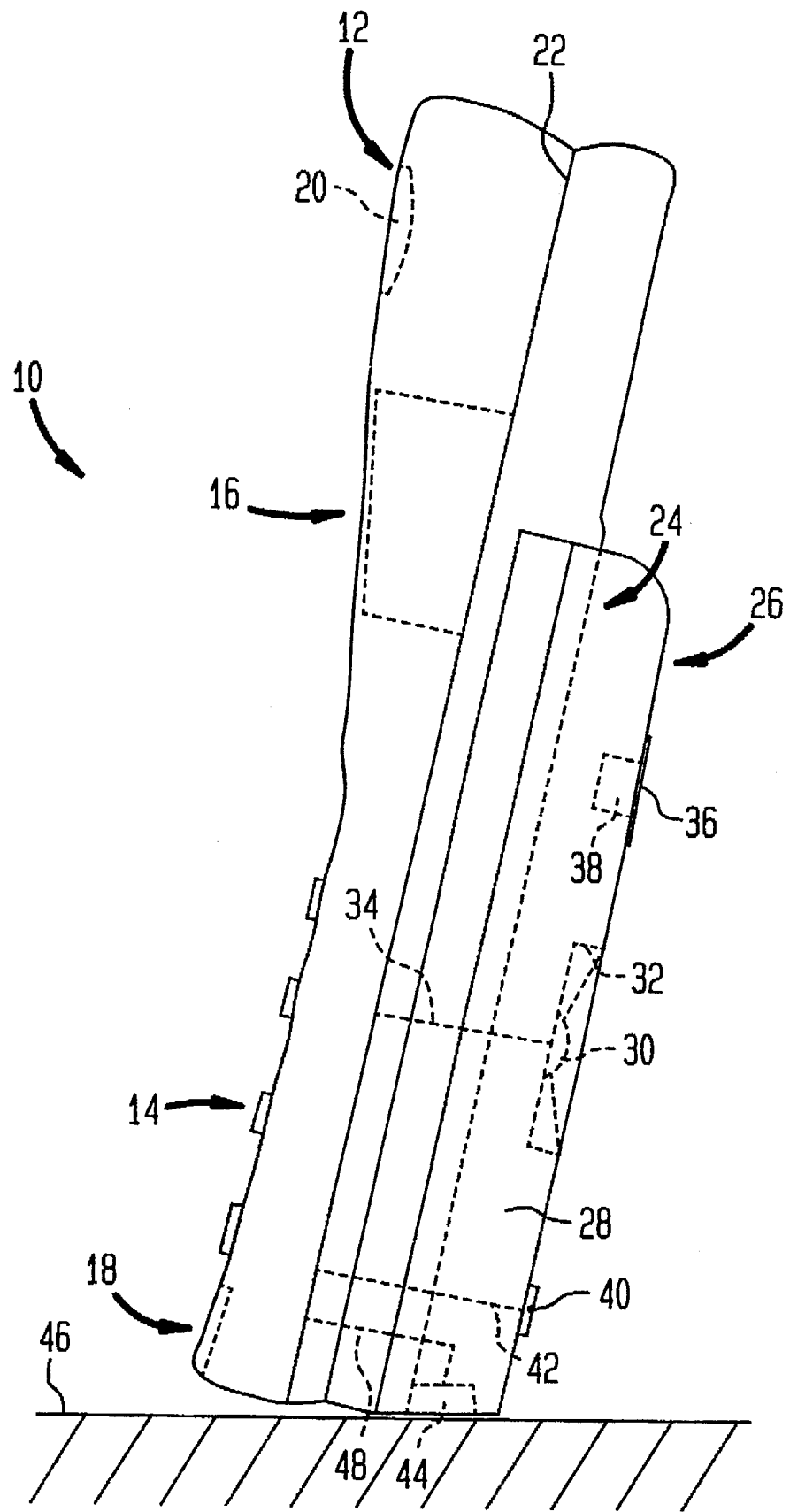

PORTABLE TELEPHONE WITH SPEAKERPHONE

BACKGROUND OF THE INVENTION

The present invention relates generally to portable telephones, and more particularly, is directed to a portable telephone with a speaker which can be integrally connected therewith.

It is known to provide speakers in telephones in order to enable hands-free operation by a user. However, such speakerphones have conventionally been mounted at the front face of the telephones so that acoustic power is radiated outwardly from the front face of the telephones in a generally single direction. As a result, there is a large loss of acoustic power with such an arrangement.

Specifically, a portable telephone contains only enough space for a very small speaker therein. As a result, such telephones have a limited acoustic output and very compromised speech fidelity. Further, the inclusion of a speaker in a portable telephone results in a larger telephone, which is contrary to market demands for smaller and lighter telephones.

Although it is known to provide larger speakers that are external to the telephone, this detracts from the portability of the telephone.

SUMMARY OF THE INVENTION

Accordingly, it is an object of the present invention to provide a portable telephone with a speaker that overcomes the problems with the aforementioned prior art.

It is another object of the present invention to provide a portable telephone with a detachable speaker.

It is still another object of the present invention to provide a portable telephone with a speaker that is removably attachable to the back face of the portable telephone.

It is still another object of the present invention to provide a portable telephone with a bass reflex speaker removably attached thereto that results in up to a 20 dB enhancement in the bass response over a conventional miniature speaker of a telephone.

It is yet another object of the present invention to provide a portable telephone with a speaker that is switched on when the telephone is resting in an upright position.

In accordance with an aspect of the present invention, a portable telephone includes a telephone body; a circuit mounted in the telephone body for receiving a signal and for supplying a signal for transmission; and a bass reflex speaker connected with the telephone body and the circuit for radiating an audio signal therefrom in response to the received signal.

The bass reflex speaker includes a housing which can be detachably or permanently connected to the telephone body, an opening in the housing, a speaker mounted in the opening of the housing and connected to the circuit for radiating an audio signal outwardly of the housing in response to the received signal, and a tuned port in the housing for radiating a back wave audio signal of the speaker therethrough.

Preferably, a tube is provided in the housing and connected with the tuned port for enhancing tuning of the tuned port.

Further, a volume control is connected to the circuit and controls a volume of the audio signal radiated from the bass reflex speaker.

Also, a pressure switch is provided for activating the bass reflex speaker to radiate the audio signal when the telephone body is positioned on a surface in an upright position.

As is conventional, the telephone includes a keypad mounted to the telephone body and by which telephone numbers can be dialed; a liquid crystal display mounted to the telephone body for displaying information; a microphone mounted to the telephone body and into which a user speaks; and a receiver mounted to the telephone body and by which the user can listen when the receiver is placed adjacent an ear of the user.

In accordance with another aspect of the present invention, a base reflex speaker for detachably connecting with a telephone body of a portable telephone having a circuit therein for receiving a signal and for supplying a signal for transmission, includes a housing dimensioned to physically connect to the telephone body, an opening in the housing; a speaker mounted in the opening of the housing and connected to the circuit for radiating an audio signal outwardly of the housing in response to the received signal; and a tuned port in the housing for radiating a back wave audio signal of the speaker therethrough.

In accordance with another aspect of the present invention, a portable telephone includes a telephone body; a circuit mounted in the telephone body for receiving a signal and for supplying a signal for transmission; and a bass reflex speaker connected with the telephone body and the circuit for radiating an audio signal therefrom in response to the transmitted signal, the bass reflex speaker including a housing connected to the telephone body, an opening in the housing, a speaker mounted in the opening of the housing and connected to the circuit for radiating an audio signal outwardly of the housing in response to the received signal, a tuned port in the housing for radiating a back wave audio signal of the speaker therethrough, a tube in the housing and connected with the tuned port for enhancing tuning of the tuned port, and a pressure switch for activating the bass reflex speaker to radiate the audio signal when the telephone body is positioned on a surface in an upright position.

The above and other objects, features and advantages of the invention will become readily apparent from the following detailed description thereof which is to be read in connection with the accompanying drawings.

BRIEF DESCRIPTION OF THE DRAWING

FIG. 1 is a side elevational view of a portable telephone with a bass reflect speaker attached thereto according to the present invention.

DESCRIPTION OF A PREFERRED EMBODIMENT

Referring to FIG. 1, a portable telephone 10 according to the present invention includes a main telephone body 12 of a generally rectangular parallelepiped configuration. Telephone 10 includes conventional telephone items, such as a keypad 14 by which telephone numbers can be dialed, a liquid crystal display (LCD) 16 for displaying information such as the number dialed and the like, a microphone 18 at the lower end of telephone body 12 and into which the user speaks, and a receiver 20 at the upper end of telephone body 12 by which the user can listen when receiver 20 is placed adjacent the ear of the user. All of the above elements 14–20 are accessible or viewable from the front face of telephone body 12. A printed wiring board (PWB) 22 is mounted within telephone body 12 and is electrically connected to keypad 14, LCD 16, microphone 18 and receiver 20 by wiring (not shown), for controlling the operations of keypad 14, LCD 16, microphone 18 and receiver 20, as is conventional. Further, an extensible antenna (not shown) extends from the upper surface of telephone body 12 and is connected to PWB 22 for transmitting a signal to receiver 20, as is conventional.

A slim battery pack 24 is also mounted with the rear portion of telephone body 12 for supplying power to the various electrical components.

In accordance with the present invention, a speakerphone is not built into portable telephone 10. As a result, the market demand for smaller and lighter telephones is met, since the telephone can be reduced in size.

However, in accordance with the present invention, in order to enable hands-free operation by a user, a bass reflex speaker 26 is removably connected to a rear face of telephone body 12. Such removable connection can occur by any conventional means (not shown), and the specific means used not being important.

Bass reflex speaker 26 includes a speaker housing 28 of a generally rectangular parallelepiped configuration, that is detachably connected to telephone body 12 by the aforementioned conventional means (not shown). A speaker 30 is mounted in housing 28 so as to project sound outwardly through a first opening 32 at the rear of housing 28. When housing 28 is connected with telephone body 12, wiring 34 and electrical connectors (not shown) connects speaker 30 to PWB 22, so that PWB 22 can drive speaker 30.

Speaker 26 further includes a tuned port 36 exiting housing 28, as with conventional bass reflex speakers. In addition, a small tube 38 can optionally be provided in housing 28 and connected with tuned port 36 to provide better tuning thereof, as is known. As a result, the back wave of speaker 30, which is lost in such speakers as acoustic suspension speakers and the like, is captured and used, that is, the back wave of speaker 26 is supplied through tube 38 to tuned port 36, from where the sound is radiated outwardly.

The volume of transmitted sound from bass reflex speaker 26 can be adjusted by a volume knob 40 or the like on housing 28, which is electrically connected through wiring 42 to PWB 22.

As a result of the above arrangement, the bass reflex effect results in an up to 20 dB enhancement in the bass response over a conventional one inch miniature speaker used in a portable telephone.

In addition, a pressure switch 44 is provided at the bottom of housing 28 so that when portable telephone 10 is resting on a surface 46 in an upright position, as shown, the speakerphone is activated. Switch 44 is connected to PWB 22 through wiring 48. Alternatively, or in addition thereto, a separate switch can be provided to turn the speakerphone on and off.

It will be appreciated that various modifications can be made to the present invention, within the scope of the claims. For example, rather than housing 28 being detachably connectable to telephone body 12, it is possible to make telephone 10 in two embodiments, one without bass reflex speaker 26 and one having bass reflex speaker 26 permanently attached thereto. In such case, it is still only necessary to construct one telephone body 12.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A portable telephone comprising:
   a telephone body having a bottom external surface;
   a circuit mounted in the telephone body for receiving a signal and for supplying a signal for transmission;
   said telephone body including a bass reflex speaker, connected with said circuit, for radiating sound waves therefrom in response to said received signal to permit hands-free operation; and
   a pressure activated switch disposed on said bottom external surface such that said pressure activated switch is switched from an off setting to an on setting for activating said bass reflex speaker when said telephone body is disposed upon a supporting surface with said bottom external surface engaging said supporting surface.

2. A portable telephone according to claim 1 wherein said bass reflex speaker includes a housing forming a portion of said telephone body, said housing being detachably connected to a remainder of said telephone body.

3. A portable telephone according to claim 1, wherein said bass reflex speaker includes a housing permanently connected to said telephone body.

4. A portable telephone according to claim 1, wherein said bass reflex speaker includes:
   a housing connected to said telephone body;
   said housing having an opening;
   a speaker connected to said circuit and mounted in said housing proximate said opening to forwardly and outwardly radiate said sound waves through said opening in response to said received signal; and
   a tuned port in said housing for radiating a backward sound wave of the speaker therethrough.

5. A portable telephone according to claim 4, wherein said bass reflex speaker further includes a tube in said housing, the tube being connected with said tuned port for enhancing tuning of said tuned port.

6. A portable telephone according to claim 4, wherein said bass reflex speaker further includes a volume control connected to said circuit, the volume control controlling the volume of said sound waves radiated from said bass reflex speaker.

7. A portable telephone according to claim 1, further comprising:
   a keypad mounted to said telephone body and by which telephone numbers can be dialed;
   a liquid crystal display mounted to said telephone body for displaying information;
   a microphone mounted to said telephone body and into which a user speaks; and
   a receiver mounted to said telephone body and by which the user can listen when the receiver is placed adjacent an ear of the user.

8. A bass reflex speaker for detachably connecting with a telephone body of a portable telephone having a circuit therein for receiving a signal and for supplying a signal for transmission, said bass reflex speaker comprising:
   a housing configured to physically connect to said telephone body;
   said housing having an opening and a bottom external surface for engaging a supporting surface when said bass reflex speaker is disposed in an upright position on said supporting surface;
   a speaker connected to said circuit and mounted in said housing proximate said opening to forwardly and outwardly radiate sound waves through said opening in response to said received signal; and a tuned port in laid housing for radiating a backward sound wave of the speaker therethrough; and a pressure activated switch disposed on said bottom external surface such that said pressure activated switch is switched from an off setting to an on setting for activating said bass reflex speaker when said telephone body is disposed upon said supporting surface with said bottom external surface engaging said supporting surface.

9. A portable telephone according to claim 8, further comprising a tube in said housing, the tube being connected with said tuned port for enhancing tuning of said tuned port.

10. A bass reflex speaker according to claim 8, further comprising a volume control connected to said circuit, the volume control controlling the volume of said sound waves radiated from said bass reflex speaker.

11. A portable telephone comprising:

a telephone body;

a circuit mounted in the telephone body for receiving a signal and for supplying a signal for transmission; and a bass reflex speaker, connected with said telephone body and said circuit, for radiating sound waves therefrom in response to said received signal to permit hands-free operation; said bass reflex speaker including:

a housing connected to said telephone body, said housing having an opening and a bottom external surface, a speaker connected to said circuit and mounted in said housing proximate said opening to forwardly and outwardly radiate said sound waves through said opening in response to said received signal, and a tuned port in said housing for radiating a backward sound wave of the speaker therethrough, a tube in said housing, the tube being connected with said tuned port for enhancing tuning of said tuned port, and a pressure activated switch disposed on said bottom external surface such that said pressure activated switch is switched from an off setting to an on setting for activating said bass reflex speaker when said housing of said bass reflex speaker is disposed upon a supporting surface with said bottom external surface engaging said supporting surface.

12. A portable telephone according to claim 11, wherein said bass reflex speaker includes the housing which is detachably connected to said telephone body.

13. A portable telephone according to claim 11, wherein said bass reflex speaker includes the housing which is permanently connected to said telephone body.

14. A portable telephone according to claim 11, wherein said bass reflex speaker further includes a volume control connected to said circuit, the volume control controlling the volume of said sound waves radiated from said bass reflex speaker.

15. A portable telephone according to claim 11, further comprising:

a keypad mounted to said telephone body and by which telephone numbers can be dialed;

a liquid crystal display mounted to said telephone body for displaying information;

a microphone mounted to said telephone body and into which a user speaks; and a receiver mounted to said telephone body and by which the user can listen when the receiver is placed adjacent an ear of the user.

* * * * *